Patented Feb. 12, 1952

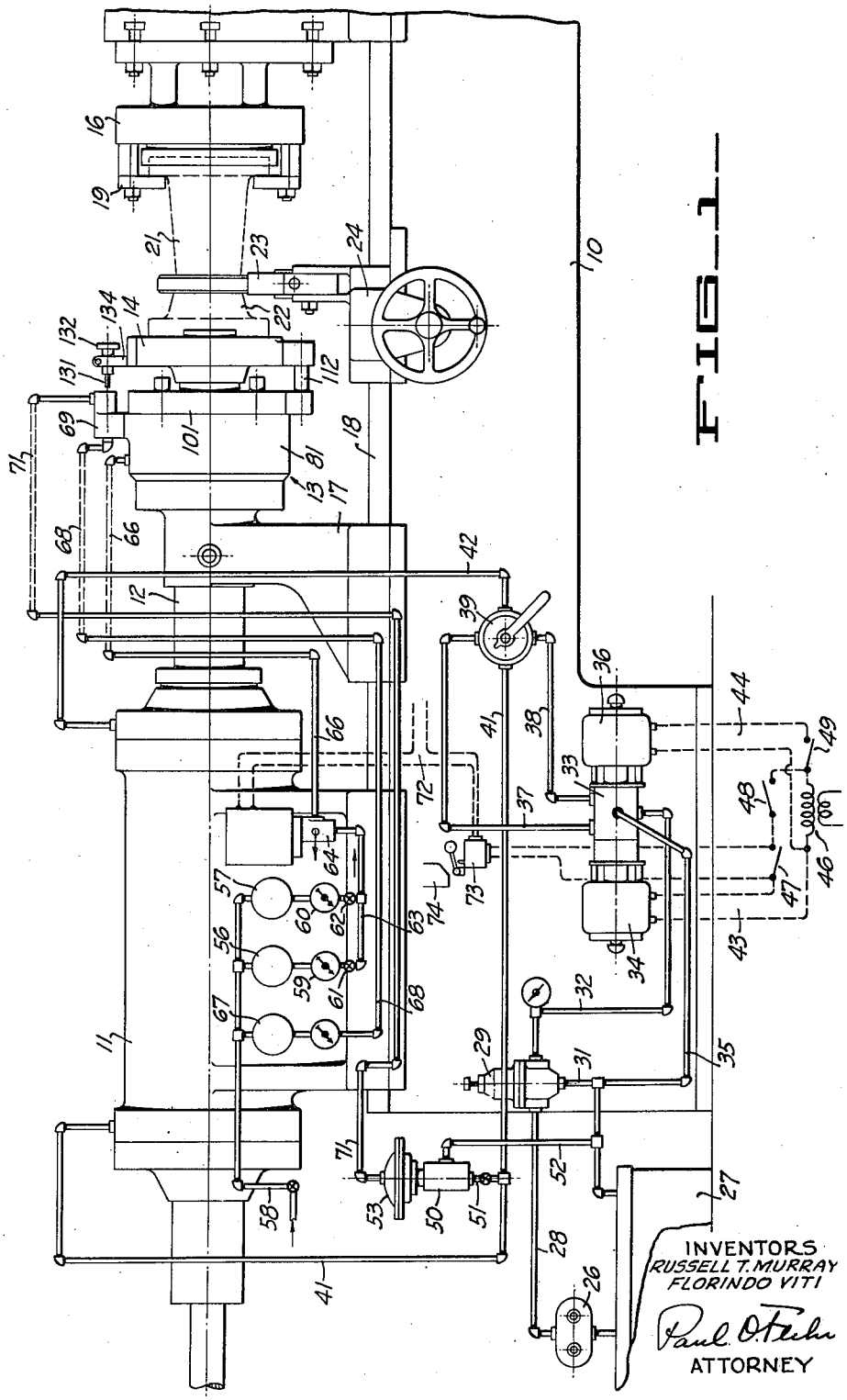

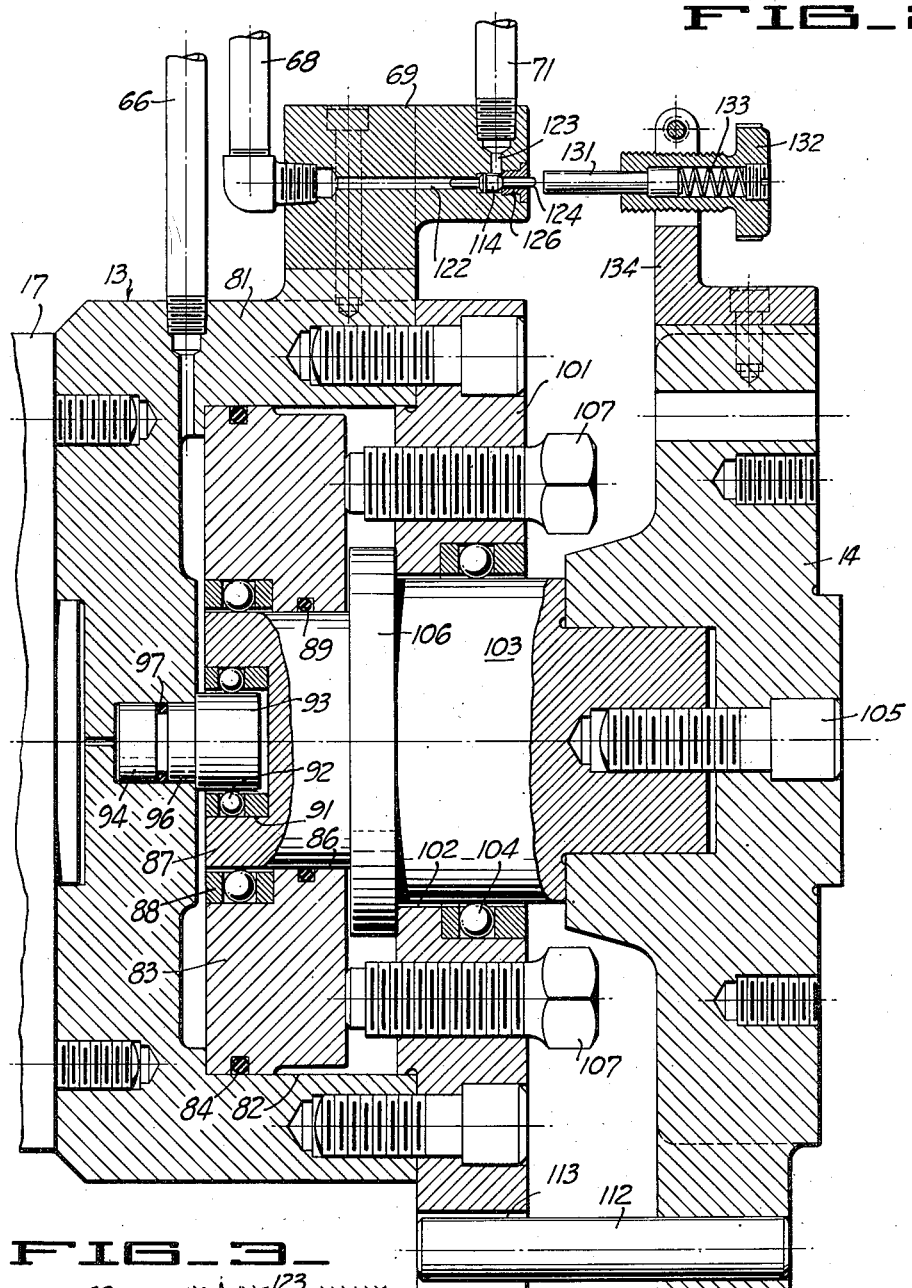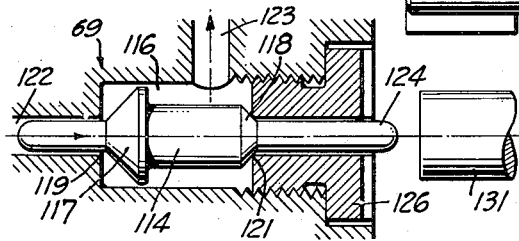

2,585,266

UNITED STATES PATENT OFFICE 2,585,266

PRESSURE WELDING MACHINE

Russell T. Murray, El Cerrito, and Florindo Viti, San Francisco, Calif., assignors to Grove Regulator Company, Oakland, Calif., a corporation of California Application September 27, 1946, Serial No. 699,858

7 Claims. (Cl. 78—84)

This invention relates generally to machines suitable for carrying out pressure welding operations.

So-called pressure welding as practiced in many metal fabricating operations makes use of a hydraulic press which receives the metal parts to be welded together, and which is capable of applying relatively high force to the joint to be welded, while heat is being applied. As the metal softens the operator supplies additional liquid to the hydraulic cylinder of the press to cause the metal parts to advance together a predetermined distance.

Pressure welding has been found critical to many factors of the method, including particularly application of the necessary force between the parts being welded both during the initial part of the heating cycle and while the parts are being advanced together. Variations in the applied force make for erratic and unsatisfactory results.

It has been found that hydraulic presses of the type heretofore used for pressure welding are not capable of producing and maintaining forces within the limits of accuracy desired. This is attributed to friction between the piston and cylinder, to leakage from the hydraulic system, and to the manner in which it is attempted to control application of liquid to the cylinder-piston assembly.

It is an object of the present invention to provide an improved pressure welding machine capable of accurate and automatic control of the forces applied.

A further object of the invention is to provide a machine of the above character which will not only maintain the desired force upon the parts being welded prior to heating, but which will also advance the parts together when the metal is softened with continued automatic control of the applied pressure.

Additional objects of the invention will appear from the following description in which the preferred embodiment has been set forth in detail in conjunction with the accompanying drawing.

Referring to the drawing:

Figure 1 is a side elevational view diagrammatically illustrating a machine incorporating the present invention.

Figure 2 is an enlarged cross sectional detail illustrating the auxiliary pneumatic assembly used with the hydraulic cylinder-piston assembly.

Figure 3 is an enlarged detail in section showing the pneumatic control valve.

The machine as schematically illustrated in Figure 1 consists of a frame 10 which serves to support the hydraulic cylinder-piston assembly 11. The force transmitting rod or ram 12 extends from one end of this assembly and is movable in opposite directions dependent upon the application of liquid to the cylinder. Instead of applying force directly from ram 12 to the parts to be welded, the ram is attached to a pneumatic device 13, which in turn carries a force applying head 14. An additional head 16 is used in conjunction with head 14, and is suitably mounted in stationary position upon the main frame or bed 10 of the machine. The main body of device 13 is shown supported by a bracket 17, which in turn is slidably carried by the horizontal ways 18.

The heads 14 and 16 are suitably formed and adapted to apply pressure to the particular metal parts which are to be pressure welded. By way of example head 16 is shown provided with clamping means 19 for engaging an end flange on the hollow annular part 21. Part 21 is to be pressure welded to a hollow annular part 22, which in turn abuts the adjacent face of head 14. As is well known to those familiar with pressure welding the adjacent end faces of parts 21 and 22 are suitably beveled and adapted to be brought together in proper alignment preparatory to the welding operation. The region to be pressure welded is shown being surrounded by the ring-like torch 23, which can be suitably supported by the horizontally movable carriage 24.

The hydraulic system for supplying liquid under pressure to the cylinder-piston assembly 11 includes a constant displacement liquid pump 26 having its inlet connected to the lower portion of the liquid supply tank 27. The discharge side of the pump connects with pipe 28 which leads to the spring loaded pressure relief valve 29. Pipe 31 connects with the relief or venting port of the valve 29, and leads back to the tank 27. Pipe 32 connects with the body of valve 29 and leads to a multiport valve 33. This valve is preferably of the slide type and is operated by two electrical solenoids 34, 36. One pipe 35 connects with valve 33 and leads back to the tank 27. Pipes 37 and 38 connect between the valve 33 and the four way hand control valve 39. Pipe 41 connects between this valve and one end of the cylinder-piston assembly 11, and the pipe 42 connects between valve 39 and the other end of the same assembly.

Suitable electrical circuits 43 and 44 connect with the solenoids 34, 36. Both circuits are supplied with current from a suitable source such as a stepdown transformer 46. Circuit 43 includes the series switches 47 and 48, and circuit 44 includes the series switch 49. Assuming that circuit 43 has last been energized, then liquid under pressure is supplied from pump 26 through the slide valve 33 to the pipe 37. The liquid from pipe 37, in turn is supplied to pipe 41 whereby the ram 12 is moved to the right as viewed in Figure 1. For another operating position of valve 33 liquid is supplied to pipes 38 and 42 and is vented from pipe 41, whereby the ram 12 is moved to the left. Valve 39 can be placed in intermediate throttling positions to control the speed of movement of the ram.

In order to control the pressure of liquid supplied to pipe 41 we provide a pressure relief regulator 50. Pipe 51 connects the inlet port of this regulator to the pipe 41, and pipe 52 connects the discharge side back to the tank 27. The valve member of this regulator is operated by a suitable diaphragm assembly 53, and the diaphragm in turn is loaded by application of gas under pressure. Relief regulators of this type are known to those skilled in the art. With continuous supply of liquid from the pump 26 to line 41, regulator 50 is set to continuously bypass liquid back to the tank 27 through pipe 52, with the rate of return being automatically adjusted to maintain a given pressure, which in turn is determined by the pressure of gas supplied to the diaphragm assembly 53.

A special automatically controlled pneumatic system is provided for controlling the loading of the relief regulator 50. Thus pressure reducing regulators 56 and 57 are provided and are supplied with air under pressure through the supply line 58. It is desirable that these regulators be capable of adjustment over a relatively wide range of outlet pressures, and for this purpose we have used with good results a regulator of the type disclosed in Patent No. 2,342,659. Different loading springs are used on the two regulators so that by using either one or the other regulator a relatively wide range of reduced pressures can be supplied. For example regulator 56 can supply reduced pressures up to 160 p. s. i., and regulator 57 pressures from 160 p. s. i. to 900 p. s. i. The outlet sides of these regulators are shown connected with suitable pressure gauges 59, 60, and hand operated valves 61 and 62 are provided for shutting off one or the other regulator. Pipe 63 leads from the regulators 56, 57 to the solenoid operated vent valve 64, which in turn is connected by pipe 66 to the body of device 13.

An additional pressure reducing regulator 67 is provided, and the low pressure side of this regulator is connected by pipe 68 to a control valve 69. Valve 69 is of the supply and waste type, and one of its ports is connected by pipe 71 to the pressure chamber of the diaphragm assembly 53 (regulator 50).

The solenoid of valve 64 is shown connected to the energizing circuit 72, which includes in series with the same the electrical switch 73. This switch is operated by engagement with the cam 74, as will be presently explained. The contacts of switch 73 can be connected in shunt with switch 47 as indicated by dotted lines.

The pneumatic device 13 includes relatively movable parts adapted to be urged apart by application of pneumatic pressure. A desirable construction is illustrated in Figure 2. The device in this instance consists of a main body 81 which is annularly contoured and adapted to be rigidly attached to the adjacent end of the hydraulic ram 12. The body is provided with an inner cylinder bore 82 within which is fitted the ringlike piston 83. The periphery of this piston is sealed with respect to the adjacent walls of the bore 82 by suitable means such as the resilient O ring 84. Piston 83 in turn provides an inner cylinder bore 86 within which is fitted a secondary piston 87. A suitable means such as a ball bearing assembly 88 maintains alignment between parts 83 and 87 and permits relative axial movement between the same with a minimum of friction. Leakage between parts 83 and 87 is prevented by suitable means such as the resilient O ring 89.

The secondary piston 87 also has an axial bore 91 serving to accommodate the ball bearing assembly 92. Fitted within this assembly there is a stud 93 which has an extension 94 fitted within a bore 96, formed in the body. Extension 94 is sealed with respect to the body by suitable means such as the resilient O ring 97. Stud 93 serves to support secondary piston 87 for limited axial movement relative to the body, while the secondary piston in turn, through the ball bearing assembly 88, serves to support the piston 83 for movement with a minimum of friction.

The main cylinder bore 82 of the body 81 is enclosed by the cover plate 101 which has a central opening 102 for receiving the cylindrical shaped thrust transmitting member 103. This member is rigidly mounted on head 14 and is retained by screw 105. The periphery of member 103 engages the ball bearing assembly 104, and its inner portion is provided with a flange 106. Circumferentially spaced set screws 107 are threaded into the cover plate 101, and the inner ends of these screws are adapted to bear against the adjacent face of the piston 83. It can be explained at this point that when screws 107 are turned to bear upon the piston 83, this piston is retained stationary and is not permitted to contact the inner end of thrust transmitting member 103. Thus the piston 87 is the only one effective for transmitting thrust to the member 103. When set screws 107 are turned to retract the same from the piston 83, both pistons 83 and 87 are permitted to move in unison, and therefore the effective fluid pressure provided is greatly increased. The arrangement just described is desirable to adapt the machine over a wide range of forces to be applied, thus making the machine better adaptable for different sized parts to be pressure welded.

Thrust transmitting member 103 is directly attached to the head 14 as by means of the screw 105. The head is shown provided with a stud 112 slidably accommodated within an opening 113 at one edge of the cover plate 101, in order to prevent relative rotation of the head with respect to the body 81.

The pilot control valve 69 is conveniently mounted upon the body 81 of the pneumatic device 13. As illustrated this valve may consist of a movable part 113 accommodated within the bore 116, and provided with the two valve elements 117, 118. These valve elements cooperate respectively with stationary seats 119 and 121. Supply pipe 68 connects with the inlet passage 122, and pipe 71 connects to the duct through the passage 123, which communicates with the opening 116. The valve part 114 is attached to an operating stem 124 which extends loosely through the retaining fitting 126. When stem 124 is moved to the left as viewed in Figure 3, (it is normally urged to the right by pneumatic pressure), there is a throttling of communication between passages 123 and 122, and simultaneously there is some venting of air to the atmosphere through the space about stem 124. When stem 124 is moved to its limiting left hand position as viewed in Figure 3, all supply of air to the passage 122 is interrupted and there is complete venting of air to the atmosphere.

To effect operation of the stem 124 we provide a pin 131 which is slidably retained within the screw 132. Compression spring 133 normally urges pin 131 to its limiting left hand position as viewed in Figure 2. Screw 132 is shown threaded within a split tab 134, which is carried by the upper edge of the head 14. With the arrangement just described it is evident that when head 14 moves a small amount to the left as shown in Figure 2, pin 131 is brought into engagement with stem 124 whereby the stem 124 is moved to the left to effect a controlled venting of air to the atmosphere and to control supply of air to the valve passage 122 and pipe 68.

Operation of the machine described above is as follows: The two arts 21 and 22 to be pressure welded together, after suitable preparation of their end faces, are loaded into the machine substantially as illustrated. At the same time the torch 23 is positioned to surround the zone to be welded together. The torch is connected to a suitable source of acetylene and oxygen gas, through suitable pressure reducing regulators and mixers. If desired an additional internal torch can be provided for the purpose of heating from within simultaneously with external heating.

Either one of the pressure reducing regulators 56 or 57 is selected for use, depending upon the size of work being welded. Assuming for example that one desires to supply a pressure of 500 p. s. i. to pipe 66 and device 13, then pressure reducing regulator 57 is selected and adjusted accordingly. Assuming that one uses the total effective fluid pressure of both pistons 83 and 87 of device 13, then both of these pistons are urged to their right hand limiting positions (Figure 2) and the head 14 cannot move relative to the body 81 except upon application of force sufficient to balance the pneumatic pressure. Assuming application of a pneumatic pressure of the order of 500 p. s. i. the force required to balance the same may for example be the order of 40,000 lbs.

Throughout operation of the machine until the weld is completed, this fluid pressure is applied continuously to the device 13. Pressure reducing regulator 67 is set to supply an outlet pressure consistent with the loading pressure requirements of the relief regulator 50. In a typical instance this may for example be of the order of 50 p. s. i. Spring loaded relief regulator 29 is set for a somewhat higher pressure than regulator 50. Assuming that pump 26 is placed in continuous operation and switch 73, closed, the button switch 48 is closed momentarily to energize the solenoid 34, with the result that liquid from pipe 32 is applied through pipes 37 and 41 whereby the ram 12 is moved to the right to supply the desired pressure upon the work. As the pressure upon the work reaches the desired value for which the machine is set the pneumatic device 13 reaches balanced condition and a small amount of relative movement occurs between the body 81 of this device and the head 14. Such movement brings the pin 131 into operative engagement with the stem 124 of the control valve 69, with the result that air is vented past the valve element 118, while valve element 117 increases the restriction between passages 123 and 122 (Figure 3). As a result the pressure in passage 123 and pipe 71 is effectively reduced, and this in turn changes the loading upon the relief regulator 50 to cause this regulator to by-pass liquid back to the tank 27. Thus upon attaining a condition of equilibrium all of the liquid from the pump 26 is by-passed by regulator 50 back to the tank, and automatic control of this regulator maintains the liquid pressure applied to pipe 41 and to the cylinder to produce the desired force upon the work.

Gas supplied to the torch 23 is ignited and the abutting portions of the parts 21, 22 rapidly heated to the point of plasticity. Upon reaching a condition of plasticity the pneumatic pressure in device 13 causes some additional advancing movement of the head 14, with the result that the control valve 69 is operated in the manner previously described to increase the loading upon the relief regulator 50, thereby in turn increasing the supply of liquid through pipe 41 to the main cylinder. The hydraulic ram 12 together with device 13 and head 14 are now advanced forwardly a predetermined distance sufficient to produce the weld desired.

Advancing movement of the head 14 is arrested by automatic means, such as a cam 74 and switch 73. Cam 74 is carried by the head 14, and switch 73 located on a stationary support whereby when the desired amount of advancing movement has taken place cam 74 operates switch 73 to close its contacts. This causes operation of the solenoid valve 64, with the result that air is vented from pipe 66, to reduce the pneumatic pressure applied to device 13 to atmospheric. Such venting results in movement of the body 81 until all of the motion between this body and head 14 is taken up, at which time pin 131 has moved the valve member 114 to its limiting position, in which communication between passages 122 and 123 is completely interrupted, and passage 123 vented to the atmosphere. Thus loading upon the relief regulator 50 is reduced to substantially atmospheric. At the same time that the solenoid valve 64 is operated by closing of switch 73, there is simultaneous operation of the solenoid 34 to completely cut off further supply of liquid to the master cylinder. Likewise switch 73 may energize another circuit (not shown) for the purpose of operating a solenoid valve to cut off supply of gas to the torch 23. The softened portions of the parts 21 and 22 solidify almost instantaneously, and these welded parts can now be removed from the machine, after removal of the torch 23. By operation of switch button 49 valve 33 is operated to apply liquid to pipe 38 rather than pipe 37, and to permit liquid from pipe 37 to vent through pipe 35 to the tank 27. This in turn serves to vent liquid through pipe 41 from the master cylinder, and to apply liquid to pipe 42. The setting of regulator 50 at this time affords sufficient pressure which when applied through pipe 41, serves to return the ram 12 to its initial position.

It will be evident from the foregoing that our machine possesses many advantages over the use of simple hydraulic presses for pressure welding. The force to be applied to the parts being welded together can be more accurately controlled and when set for a given value, the same force is obtained for successive operations to produce consistent welding results on a production basis. The force applied to the work is made independent of friction between the moving parts, particularly having reference to friction between the hydraulic piston and its associated cylinder. In addition to obtaining the desired force upon the parts to be welded during the initial part of the heating cycle, the parts are forced together upon the metal reaching the plastic state in such a manner as to produce a good pressure weld, and with continued application of the force required for the upsetting operation. In addition to the features mentioned our machine is relatively simple to operate, and to adjust for different types of work.

We claim:

1. In a machine for butt pressure welding operations of the type in which abutting parts to be welded are urged together, flash heated, and then forced together to complete a weld, a hydraulic cylinder-piston assembly, means for supplying liquid under pressure to said assembly, a pneumatic cylinder-piston assembly, said last named assembly being arranged to transmit force from the first assembly to the abutting metal parts to be welded, means for supplying gas under pressure to said last named assembly whereby for a given pneumatic pressure applied the cylinder and piston of the pneumatic assembly will be in balanced condition for a given force being applied to the metal parts being welded, a pneumatic control valve of the supply and waste type operated responsive to relative movements between the cylinder and piston of the pneumatic assembly, a source of air under pressure connected to said valve, a gas pressure loaded relief regulator adapted to control the supply of liquid to the first named assembly, and a pneumatic connection between said last named valve and said control valve whereby the pressure of liquid supplied to the hydraulic cylinder-piston assembly is controlled in response to relative movement between the cylinder and piston of the pneumatic assembly.

2. In a machine for butt pressure welding operations of the type in which abutting parts to be welded are urged together, flash heated, and then forced together to complete a weld, means adapted to apply force to metal parts being pressure welded, means for applying heat to said parts in the region of the welding zone, and means serving to continue application of force as the two parts being welded advance together at the end of the heating cycle, said means functioning responsive to relative movement between the metal parts in a direction toward each other.

3. In a machine as in claim 2 in which means is provided to limit advancement of the two parts together.

4. In a machine for butt welding operations, a frame, working heads carried by the frame and between which parts to be butt welded may be placed, one of said heads being mounted stationary on the frame, a hydraulic cylinder carried by the frame, a movable hydraulically operated ram extending from the cylinder, a source of liquid under pressure for the cylinder, a device for controlling supply of liquid to the cylinder from said source, a pneumatic cylinder carried by the ram, a piston fitted in said cylinder and attached to said other head, a source of air under pressure connected to said pneumatic cylinder, and means for controlling the presure of liquid supplied from said source to said cylinder in accordance with relative movement between said other working head and the ram.

5. A machine as in claim 4 in which said last named means comprises a valve of the supply and waste type actuated by relative movement of said other working head relative to the ram.

6. In a machine for butt welding operations, a frame, working heads carried by the frame and between which parts to be butt welded may be placed, one of said heads being mounted stationary on the frame, a hydraulic cylinder carried by the frame, a movable ram extending from the cylinder, a source of liquid under pressure for the cylinder, pneumatic pressure loaded regulating means for controlling the pressure of liquid supplied from said source to said cylinder, a pneumatic cylinder carried by the ram, a piston fitted in said cylinder and attached to said workhead, said ram together with said pneumatic cylinder and said piston being in alignment, a source of air of predetermined pressure connected to said pneumatic cylinder, and means for controlling the pressure of liquid supplied from said source to said cylinder in accordance with relative movement between said other working head and the ram, said means comprising a source of air under pressure, valve means of the supply and waste type connected to said source of air pressure, a connection between said valve means and said regulating means whereby the pressure of air supplied to said regulating means determines the loading of the same and the pressure of liquid supplied to said cylinder, and means for operating said valve means responsive to relative movement between said other working head and said ram, thereby causing the pneumatic piston to assume a balanced position with respect to the ram for application of a predetermined force to the parts to be welded.

7. In a machine for butt pressure welding operations, hydraulic means adapted to apply force in response to supply of liquid under pressure to the same, relatively movable members providing a closed chamber interposed between the hydraulic means and the abutting metal parts to be welded, whereby force from the hydraulic means is transmitted through said members, said chamber being adapted to receive gas under pressure whereby for a given pressure of gas supplied said members transmit a given force to said metal parts for a substantially balanced condition between said members, means for supplying liquid under pressure to said hydraulic means, valve means serving to control the supply of liquid to said hydraulic means, and pneumatic means serving to control said last named means, said last named means including a control valve of the supply and waste type operated responsive to relative movements between said members.

RUSSELL T. MURRAY.
FLORINDO VITI.

REFERENCES CITED

The following references are of record in the file of this patent:

UNITED STATES PATENTS

| Number | Name | Date |
| --- | --- | --- |
| 1,764,098 | Galloway | June 17, 1930 |
| 2,146,537 | Farnham | Feb. 7, 1939 |
| 2,374,577 | Bench et al. | Apr. 24, 1945 |
| 2,392,824 | Lytle et al. | Jan. 15, 1946 |